United States Patent
Filippi et al.

(10) Patent No.: US 10,287,174 B2
(45) Date of Patent: May 14, 2019

(54) METHOD FOR REVAMPING A FRONT-END OF AN AMMONIA PLANT

(71) Applicant: Casale SA, Lugano (CH)

(72) Inventors: Ermanno Filippi, Castagnola (CH); Raffaele Ostuni, Lugano (CH)

(73) Assignee: Casale SA, Lugano (CH)

( * ) Notice: Subject to any disclaimer, the term of this patent is extended or adjusted under 35 U.S.C. 154(b) by 0 days.

(21) Appl. No.: 15/301,870

(22) PCT Filed: Apr. 3, 2015

(86) PCT No.: PCT/EP2015/097010
§ 371 (c)(1),
(2) Date: Oct. 4, 2016

(87) PCT Pub. No.: WO2015/155374
PCT Pub. Date: Oct. 15, 2015

(65) Prior Publication Data
US 2017/0029282 A1    Feb. 2, 2017

(30) Foreign Application Priority Data
Apr. 8, 2014   (EP) .................... 14163911

(51) Int. Cl.
*C01C 1/04*    (2006.01)
*C01B 3/38*    (2006.01)
*C01B 3/02*    (2006.01)

(52) U.S. Cl.
CPC .......... *C01C 1/0482* (2013.01); *C01B 3/025* (2013.01); *C01B 3/38* (2013.01); *C01B 3/382* (2013.01);
(Continued)

(58) Field of Classification Search
CPC ..... C01C 1/0482; C01C 1/0417; C01B 3/025; C01B 3/38; C01B 2203/0244;
(Continued)

(56) References Cited

U.S. PATENT DOCUMENTS

| 2002/0143219 A1* | 10/2002 | Price ........... C01B 3/025 585/16 |
| 2007/0299144 A1* | 12/2007 | Davey .......... C01B 3/025 518/703 |
| 2008/0170980 A1* | 7/2008 | Reddy .......... C01B 3/025 423/359 |

FOREIGN PATENT DOCUMENTS

EP   2 022 754 A1   2/2009
EP   2 284 125 A1   2/2011
(Continued)

OTHER PUBLICATIONS

International Search Report issued in connection with PCT/EP2015/097010.

*Primary Examiner* — Daniel McCracken
(74) *Attorney, Agent, or Firm* — Akerman LLP

(57) ABSTRACT

A method for revamping a front-end of an ammonia plant, said front-end comprising a reforming section (1, 2) with air-fired secondary reformer or autothermal reformer (2), a treatment section (3) of the effluent from said reforming section, and an air feed compressor (6), wherein an $O_2$-containing stream (8) is directed to said reforming section (2) for use as oxidant, at least one nitrogen stream (9) is introduced at a suitable location of the front-end, to provide a desired molar ratio between hydrogen and nitrogen in the product gas, and at least part of said nitrogen stream (9) is compressed via said feed compressor (6).

13 Claims, 3 Drawing Sheets

(52) U.S. Cl.
CPC .... *C01C 1/0417* (2013.01); *C01B 2203/0233* (2013.01); *C01B 2203/0244* (2013.01); *C01B 2203/0283* (2013.01); *C01B 2203/0415* (2013.01); *C01B 2203/0445* (2013.01); *C01B 2203/0475* (2013.01); *C01B 2203/068* (2013.01); *C01B 2203/142* (2013.01); *C01B 2203/143* (2013.01)

(58) Field of Classification Search
CPC ...... C01B 2203/0233; C01B 2203/068; C01B 3/382; C01B 2203/0283; C01B 2203/0415; C01B 2203/0445; C01B 2203/0475; C01B 2203/142; C01B 2203/143
See application file for complete search history.

(56) References Cited

FOREIGN PATENT DOCUMENTS

| | | |
|---|---|---|
| EP | 2 631 213 A1 | 8/2013 |
| EP | 2 662 327 A1 | 11/2013 |
| WO | 98/45211 A1 | 10/1998 |
| WO | 2012/004032 A1 | 1/2012 |
| WO | 2014/019610 A1 | 2/2014 |

* cited by examiner

METHOD FOR REVAMPING A FRONT-END OF AN AMMONIA PLANT

This application is a national phase of PCT/EP2015/097010, filed Apr. 3, 2015, and claims priority to EP 14163911.2, filed Apr. 8, 2014, the entire contents of both of which are hereby incorporated by reference.

FIELD OF APPLICATION

The invention relates to the revamping of ammonia plants. The invention relates in particular to the revamping of a front-end section of an ammonia plant, producing a make-up gas for the synthesis of ammonia.

PRIOR ART

The synthesis of ammonia ($NH_3$) requires a synthesis gas comprising hydrogen ($H_2$) and nitrogen ($N_2$) in a suitable ratio of about 3:1. The term ammonia syngas will be used with reference to a synthesis gas with the above composition.

It is known to produce said ammonia syngas from the reforming of a desulphurized natural gas, by means of a primary steam reforming and subsequent secondary reforming of the effluent (EP 2 022 754).

According to the prior art, the hydrocarbon feedstock is steam-reformed in a primary reformer and the gas produced is further reacted with an oxidant stream in a secondary reformer. The reformed gas exiting the secondary reformer is then purified, especially to remove carbon oxides and obtain a gas composition suitable for ammonia synthesis, i.e. having a $H_2/N_2$ molar ratio (HN ratio) close to 3:1. The purification section generally includes shift converters where CO is converted to carbon dioxide and hydrogen, a $CO_2$ removal unit and a possibly a methanator reactor.

The secondary reformer is also termed autothermal reformer (ATR). Said term of "autothermal reformer" denotes a catalytic converter where oxidation of the hydrocarbon source takes place and provides the heat for reforming. Pure autothermal reforming without primary reforming is also possible.

Several methods to revamp existing ammonia plants in order to increase their production capacity or reduce their energy consumption are known in the art. Known methods include the use of oxygen or oxygen enriched air instead of air as oxidant in the secondary (autothermal) reformer. This can be accompanied by addition of a nitrogen stream to the synthesis loop section, in order to provide the required $H_2:N_2$ molar ratio of around 3 for the ammonia synthesis reaction. Dedicated air separation units (ASU) can be provided to furnish oxygen to the reforming and nitrogen to the purification section. Some examples are WO 2012/004032 and EP 2 631 213.

Both the oxidant and the nitrogen are required at the frontend pressure, typically in the range of 20-50 bar.

However, this method involving the separated supply of oxygen and nitrogen to the front-end plant is very expensive, mainly owing to the presence of the ASU, which contains large compressors. This impairs the economics of the revamp.

The main components of an ASU include typically:
an air feed compressor;
reversible exchangers or sieve adsorbers to purify the air by removing water and CO2;
a cold plant section (the so-called cold box);
a product compression system.

The cold box operates at cryogenic temperatures, wherein the air is separated in their components with the required purities. The cold box mainly includes separation columns and heat exchangers.

The product compression system may comprise either two gas compressors, or the combination of a gas compressor and an internal liquid product pumping. If some product is delivered with cryogenic internal pumping, a booster air compressor is also needed.

The oxidant and the nitrogen can be compressed before entering, respectively, the secondary reformer and the purification unit, inside the ASU or in a dedicated compressor.

In case of internal pumping of either the oxidant or the nitrogen, the delivery pressure of the cold box of the ASU (outlet of the feed-effluent exchanger) is the frontend pressure. In case of external compression of either the oxidant or the nitrogen, said delivery pressure of the cold box is typically around 1-5 bar, and is referred to as "near-ambient pressure".

Hence, an air separation unit typically requires at least three large compressors. Said compressors are very expensive and greatly affect the cost of the ASU, and in turn the cost of the ammonia plant revamp. For the above reasons, a revamping including the provision of an air separation unit may become less attractive. In some cases, oxygen-containing current and a nitrogen-containing current may be available and used for revamping without the provision of a new air separation unit, however there is still the need to get said currents at a suitable pressure.

A method of revamping of an ammonia plant fed with natural gas is also known from EP-A-2 662 327.

SUMMARY OF THE INVENTION

The aim of the invention is to overcome the drawbacks of the prior art as above discussed. In particular, the invention aims at reducing the costs of revamping of a plant with air-fired secondary reformer or autothermal reformer, when dedicated streams containing oxygen and nitrogen, for example generated from an air separation unit, are used.

These aims are reached with a method according to claim 1. The invention features that an oxygen current is fed to the reforming section, in particular to the secondary reformer or autothermal reformer, to provide some of the oxidant. Said oxygen current has a purity in terms of O2 molar content of at least 50% molar preferably. Hence said secondary reformer will operate with O2-enriched air or with substantially pure oxygen according to various embodiments. Accordingly, the method of the invention can be regarded to as oxygen-based revamping.

In addition, a nitrogen current is introduced at a suitable location of the plant, preferably in the treatment section, in order to provide the required $H_2:N_2$ molar ratio. A feature of the invention is that at least a portion of said nitrogen current is compressed with the air compressor, formerly used to feed air to the secondary reformer or ATR. Said compressor is also termed process air compressor (PAC).

Said oxygen current and nitrogen current are normally generated by an air separation unit. In some embodiments, the method of the invention may comprise the installation of a new air separation unit for this purpose. The invention however is also applicable when an air separation unit is already available.

The process air compressor PAC can be revamped, e.g. in order to accommodate more flow rate. This is however not essential and some embodiments provide that the PAC is not revamped and used as it is.

In the embodiments featuring revamp of the PAC, said compressor is generally able to furnish all (or at least a major part of) the nitrogen required in the plant. Accordingly, in these embodiments the oxygen current directed to the reforming stage has preferably a high purity. Said purity of the oxygen current is preferably at least 90% molar and more preferably more than 95% molar. In the embodiments where the PAC is not revamped, on the other hand, it might happen that the PAC is not able to accommodate the required amount of nitrogen. In the latter case, it can be preferred to introduce some nitrogen with the oxygen current, which will have a lower purity, e.g. 50% to 90% molar and more preferably 70% to 90% molar. In other words, the gaseous nitrogen flow rate is selected in order to match the capacity of the existing air compressor and the remaining nitrogen is introduced with the oxygen.

According to further embodiments of the invention, a stream of nitrogen exiting an air separation unit is split in two streams, namely a first low-pressure stream and a second high-pressure stream. Said first stream is compressed by the PAC; said second stream can be fed directly to the plant, bypassing the PAC. The amount (flow rate) of said first stream can be determined to match the capacity of the PAC, which can be revamped or not. In this embodiment the oxidant purity will be determined according to the entity of the splitting and the capacity of the air compressor.

This method solves effectively the problem of the high revamp cost, because it avoids one of the three gas compressors, since the pressure of delivery from the ASU results to be lower, typically around 1-5 bar (near-ambient pressure), instead of 20-50 bar (frontend pressure), owing to the presence of an external compressor. In addition, no extensive modifications to the existing air compressor are made, although plant capacity is increased substantially.

Even if a revamped PAC is used, no extensive modifications are required although the plant capacity is increased. For example, for a 50% capacity increase, the flow rate in the process air compressor used for nitrogen is only 10% higher compared to the case at lower capacity.

The existing PAC is greatly debottlenecked, owing to synergies with the oxygen-based revamping method. In particular, the invention involves the following findings.

The process air compressor compresses pure nitrogen, with no traces of oxygen, water and $CO_2$. An air pretreatment section inside the ASU is required in order to remove all the impurities, hence to avoid vapour condensation, liquid water solidification and gaseous $CO_2$ condensation. As a result, nitrogen emerges pure and dry from the ASU. Other components, e.g. argon are only present at ppm level.

The molecular weight of nitrogen (MW=28) is very similar to that of the average MW of air (about 29). Hence, the characteristic curves of the compressor do not change substantially and the compressor behavior (speed vs pressure ratio, speed vs efficiency) is compatible with the new process conditions.

The discharge pressure of the PAC is lower than before (typically around 5 bar), because the nitrogen can be introduced downstream the purification section, thereby saving the pressure drop of the upstream equipment.

These and other benefits of the invention will become clearer with the help of the following description and of the figures referring to preferred embodiments.

DETAILED DESCRIPTION OF PREFERRED EMBODIMENTS

Figure 1:
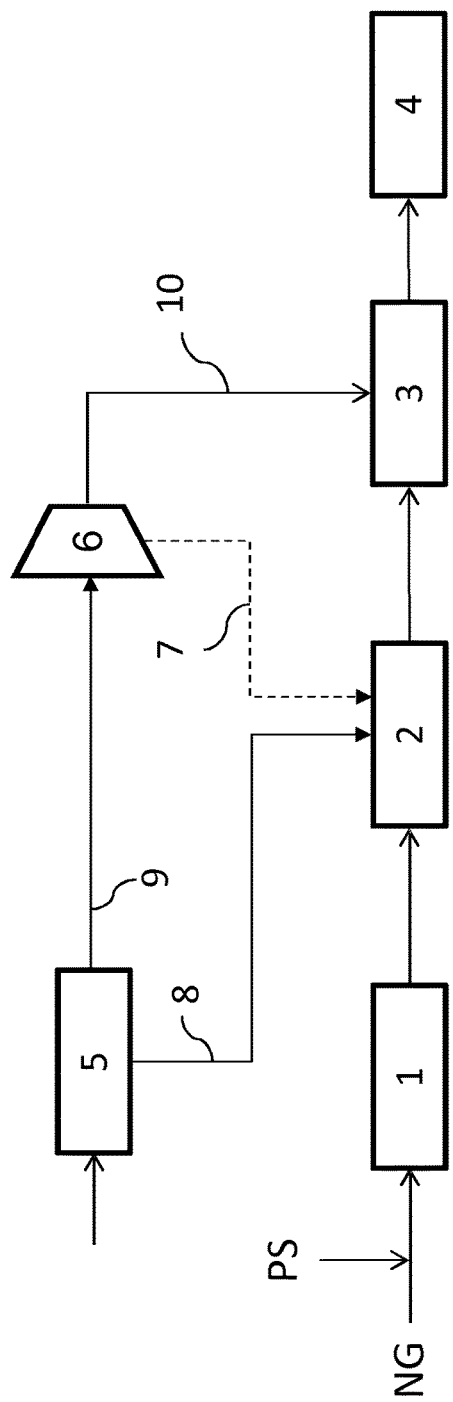
FIG. 1 is a block diagram of a first embodiment of the invention.

FIG. 1 shows a first embodiment of the invention.

A front end for the generation of ammonia synthesis gas comprises a primary reformer 1, a secondary reformer 2 and a treatment section 3. Said treatment section 3 may include shift converters and purification units, i.e. $CO_2$ removal and methanation. The purified gas leaving said section 3 feeds ammonia synthesis section 4.

The secondary reformer 2 is originally fired by air 7 delivered by a compressor 6.

The method of the invention makes use of an oxygen current 8 and a nitrogen current 9 furnished by an air separation unit 5. Installation of said unit 5 may be part of the method of the invention, in some embodiments.

Said air separation unit 5 delivers the nitrogen current 9 at near-ambient pressure, for example 1 to 5 bar. Said current 9 is compressed via the air compressor 6, and the compressed nitrogen 10 is delivered to a suitable location of the front-end, preferably the treatment section 3. For example, the nitrogen is introduced after a CO2 removal section or after a methanation section. The air line 7 may be discontinued.

Since the nitrogen current 9 is compressed by the air compressor 6, one of the internal compressor of the ASU 5 can be avoided, i.e. the ASU is not required to export the nitrogen current 9 at the higher front-end pressure.

The plant of FIG. 1 operates as follows: a natural gas feedstock NG is mixed with a steam current PS and enters the primary reformer 1. The reformed gas leaving the primary reformer is fed to the auto-thermal secondary reformer (2), now operating as oxygen-fired reformer due to oxygen input 8 from the ASU 5. The ASU 5 also furnishes nitrogen 9 to be added to the treatment section 3 in order to provide the required $H_2:N_2$ molar ratio of around 3 for the ammonia synthesis reaction. The compressor 6 is used for compressing all the nitrogen separated from air and leaving the ASU 5.

The purity of the current 9 is preferably above 90%. For example, the flow rate of the oxidant is 1428 kmol/h and the oxygen contained is 1365 kmol/h, while the nitrogen is 30 kmol/h and other components (e.g. argon) are 33 kmol/h.

Figure 2:
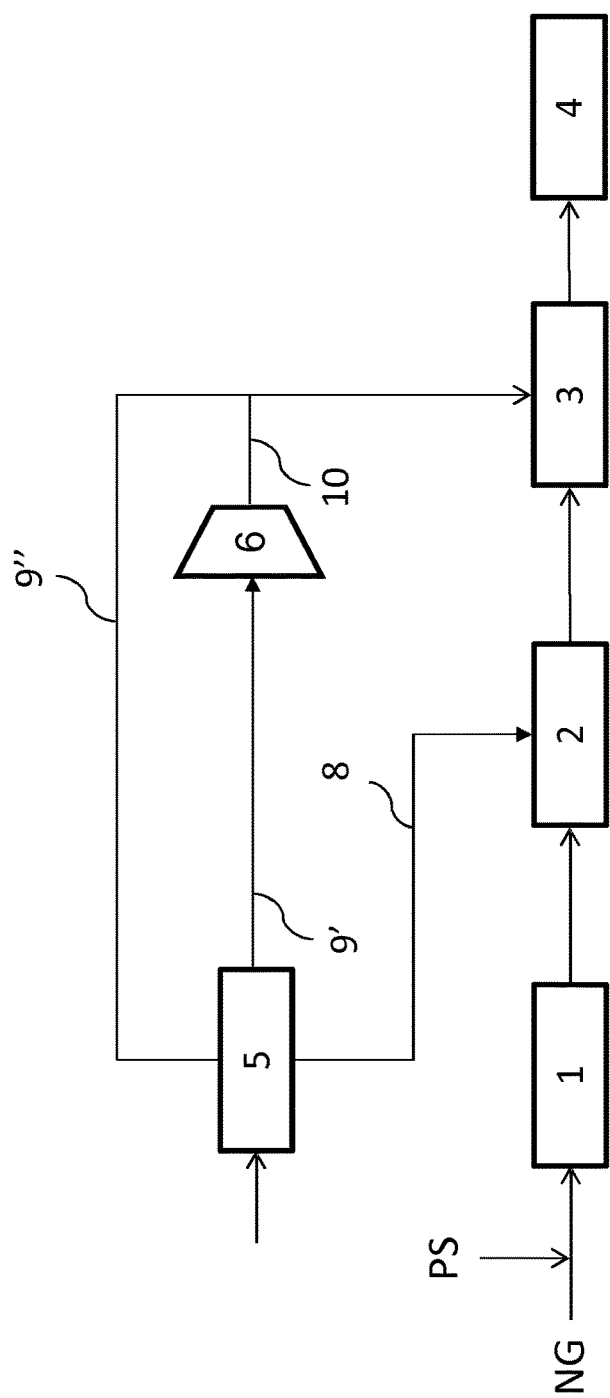
FIG. 2 is a block diagram of a second embodiment of the invention.

FIG. 2 shows a second embodiment of the invention, where the ASU 5 delivers a first nitrogen current 9' at low pressure and a second current 9" at high pressure. Typically, said second current 9" is cryogenically pumped at the frontend pressure, e.g. 20 to 50 bar.

The first current 9' is compressed with the air compressor 6, while the second current 9" is fed directly to the treatment section 3, possibly joined with the delivery 10 of said compressor.

The ratio between these two currents 9' and 9" is selected in order to match the capacity of the existing air compressor 6 thereby minimizing or avoiding the modifications.

Figure 3:
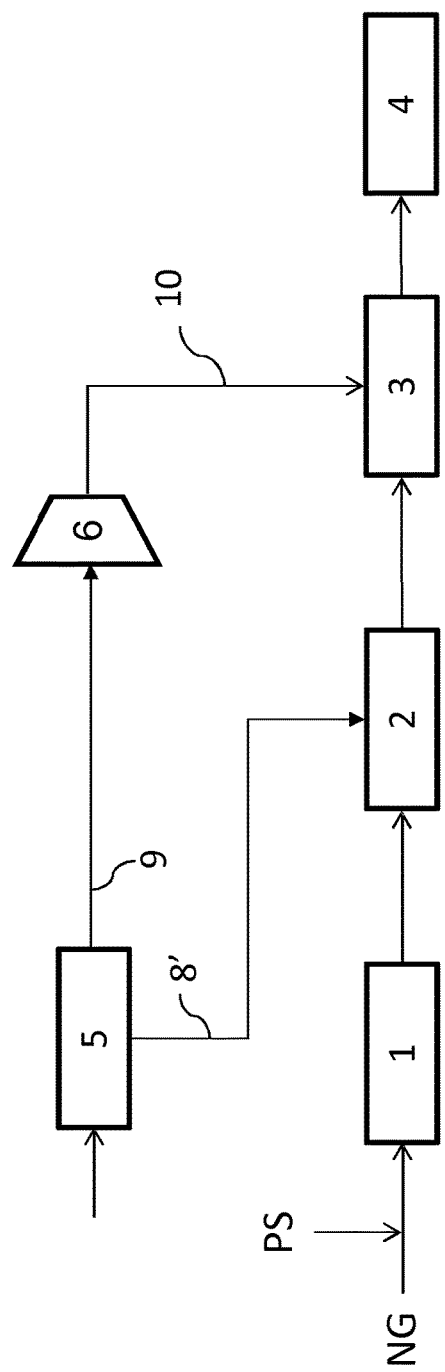
FIG. 3 is a block diagram of a third embodiment of the invention.

FIG. 3 shows a third embodiment of the invention, where the ASU 5 delivers all the nitrogen 9 at a low pressure and the compressor 6 is not revamped compared to the original conditions. In this case, the amount of nitrogen in the current 9 may not be enough to reach the required 3:1 ratio, and it can be preferred to use an oxygen current 8' of a lower purity, to introduce the missing nitrogen with said current 8'.

The purity of said current 8' may be for example around 70-90%. For example, the flow rate of the oxidant is 1754 kmol/h and the oxygen contained is 1365 kmol/h, while the nitrogen is 356 kmol/h and other components (e.g. argon) are 33 kmol/h.

The relative balance of oxygen and nitrogen depends on the process, particularly on the methods for purification of the syngas (e.g. by PSA, $N_2$ sweeping PSA, or liquid nitrogen wash, or simple methanation) and on the purge stream in the synthesis loop. PSA (pressure swing adsorption) may be used to remove carbon dioxide and other impurities such as CO, CH4, Ar. For instance, if the purification section includes a PSA unit, a slight excess of oxygen to be fed to the process is required. In this process traces of hydrogen are also removed, hence the consumption of oxygen slightly increases. On the other hand, if the purification section includes a liquid NW (nitrogen washing) unit for the removal of impurities like CO, Ar and $CH_4$ from a crude hydrogen stream, a slight excess of nitrogen to be fed to the process is required. In fact in this process a certain amount of nitrogen (e.g. 10-15%) is lost in the tail gas, thus requiring an increased consumption.

The effect of these modifications, however, does not modify substantially the method exposed, since the variation of the total oxygen or nitrogen flow is small if compared with the total requirement for the ammonia process.

Similarly, an air separation unit could also deliver other nitrogen streams, depending on the specific process and plant requirements, for continuous or discontinuous flows, such as nitrogen for regeneration of molecular sieves, or sweeping of a PSA unit, or liquid nitrogen for cooling of a liquid nitrogen wash, or for filling a liquid nitrogen tank. Also the effect of these modifications does not modify substantially the method exposed.

The invention claimed is:

1. A method for revamping a front-end of an ammonia plant, said front-end delivering a product gas for the synthesis of ammonia and comprising:
   a reforming section, comprising an air-fired secondary reformer or autothermal reformer, operating at a front-end pressure;
   a treatment section treating the effluent from said reforming section;
   an air compressor suitable for feeding air to said reforming section for use as an oxidant;
   the method comprising the steps of:
   feeding an O2-containing stream to said reforming section for use as oxidant;
   introducing at least one nitrogen stream at a location of the front-end, to provide a molar ratio between hydrogen and nitrogen in the product gas, and
   compressing at least part of said nitrogen stream via said feed compressor.

2. The method according to claim 1, wherein said O2-containing stream and said nitrogen stream are generated by an air separation unit.

3. The method according to claim 2, wherein said revamping comprises the installation of an air separation unit.

4. The method according to any claim 1, wherein all of said nitrogen stream is compressed by said air compressor.

5. The method according to claim 1, wherein said nitrogen stream is delivered by an air separation unit and enters said air compressor at near-ambient pressure.

6. The method according to claim 1, wherein: a first nitrogen current is compressed by said air compressor and a second nitrogen current, at a pressure higher than said first current, is fed directly to the front-end by-passing said compressor.

7. The method according to claim 6, wherein said first current and said second current are produced by an air separation unit, said first current being delivered by said unit at a near-ambient pressure and said second current being delivered by said unit at around said frontend pressure.

8. The method according to claim 1, wherein said O2-containing stream has a purity of at least 90% molar.

9. The method according to claim 1, wherein said O2-containing stream comprises a suitable amount of nitrogen, which, added with said nitrogen stream, provides the required H2:N2 molar ratio in the product gas.

10. The method according to claim 9, wherein said O2-containing stream has a purity of at least 50% molar.

11. The method according to claim 1, wherein said nitrogen stream is delivered by an air separation unit and enters said air compressor in the range 1 to 5 bar.

12. The method according to claim 10, wherein said O2-containing stream has a purity of 50 to 90% molar.

13. The method according to claim 12, wherein said O2-containing stream has a purity of 50 to 90% molar.

* * * * *